United States Patent [19]

Voorhies

[11] Patent Number: 4,647,723
[45] Date of Patent: Mar. 3, 1987

[54] CIRCUIT FOR DETECTION OF OFF-HOOK CONDITION OF EXTENSION TELEPHONES

[75] Inventor: Kenny R. Voorhies, Huntsville, Ala.

[73] Assignee: GTE Communications Systems Corp., Northlake, Ill.

[21] Appl. No.: 732,122

[22] Filed: May 9, 1985

[51] Int. Cl.⁴ .......................................... H04M 1/00
[52] U.S. Cl. .................................... 379/381; 379/164
[58] Field of Search ............... 179/81 C, 84 L, 99 LS, 179/81 R, 99 H, 99 R

[56] References Cited

U.S. PATENT DOCUMENTS 3,395,256  7/1968  Limiero et al. ................. 179/99 LS
4,394,544  7/1983  De Leon ....................... 179/81 C X Primary Examiner—James L. Dwyer
Attorney, Agent, or Firm—Robert J. Black

[57] ABSTRACT

A solid state circuit designed to be incorporated into a telephone terminal instrument to provide a visual indication at that instrument that a telephone line to which the instrument is connected is already in use by another telephone instrument.

6 Claims, 1 Drawing Figure

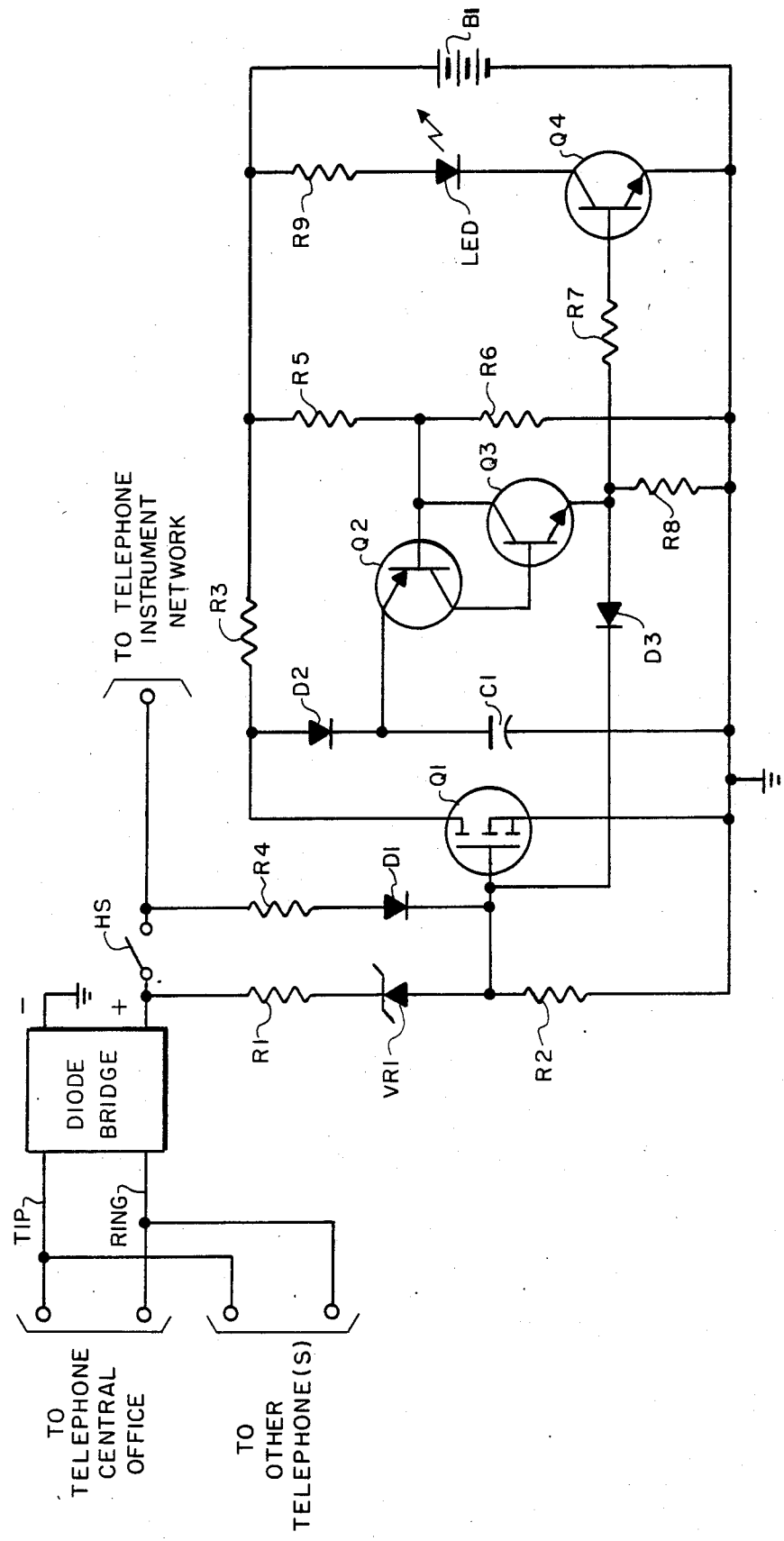

CIRCUIT FOR DETECTION OF OFF-HOOK CONDITION OF EXTENSION TELEPHONES

FIELD OF THE INVENTION

The present invention pertains to residential and business telephones and similar terminal equipment where two or more telephones or instruments have access to the same telephone line or lines and more particularly to a circuit for providing a visual indication as to whether or not a telephone line(s) to which the subscriber's instrument is connected is already in use.

BACKGROUND ART

The indication of the busy or non-busy status of a telephone line has traditionally been accomplished by the telephone switching system to which the instrument is connected. Such an arrangement usually requires a multiwire connection between the telephone switching system and the instrument. Such systems are not normally utilized in residential use and may or may not be available to business users. Where the capability of providing a line status indication was available, it was primarily available only in telephones used in a business application associated with a private automatic branch exchange (PABX) or a key telephone system. Those telephone instruments capable of indicating line status particularly require extra hookswitch contacts, incandescent lamps and extra conductors in the line cord in order to establish the necessary connections to the PABX or Key Service Unit (KSU) which provide the status signals.

SUMMARY OF THE INVENTION

The present invention is a circuit designed to be placed entirely within a user's telephone or other telephone related terminal equipment that acquires no additional hookswitch contacts, line cord conductors or special signals from the associated switching point. The circuitry has the ability to detect use of a line by another instrument attached to the same line and in response to detection gives a flashing visual indication that the line is in use by another instrument. Should the subscriber's own telephone or similar unit be in use on that telephone line a flashing indication will not be given regardless of whether or not another instrument may or may not be in use at that time on the same line. An important aspect of the invention is the minimal loading effect it places on the telephone line. This is particularly important in order to comply with the direct current ringer equivalence requirements of the Federal Communications Commission. Other features of the included circuitry is the use of battery power and circuitry so configured as to provide for exceptionally long battery life.

The off-hook detection circuitry of the present invention comprises four subcircuits, the first of these is a voltage level sensing circuit connected to the telephone line and including a zener diode. The second is a charge timing circuit including a capacitor connected to a battery, with a field effect transistor operated to normally shunt the flow of current from the battery around the capacitor as long as proper voltage is available at the telephone line. Proper voltage is the full voltage available from the telephone central office or switching location and is indicative of no extension telephone being in the off-hook condition. The third subcircuit is a latch circuit and the fourth a visual indicator circuit including a light emitting diode.

Throughout the remainder of this discussion any terminal equipment, a telephone, or a modem which can be used or connected to the same line as the primary instrument shall be referred to as an extension or as a telephone instrument. Activation of any telephone instrument attached to the line shall be referred to as going "off-hook". Going "on-hook" shall mean the deactivation of a telephone instrument.

In operation with no instruments off-hook, the sensing circuit senses normal tip and ring voltage and disables the indicator circuit. If the primary instrument goes off-hook with no extension in the off-hook condition, the sensing circuit maintains the indicator circuit in the disabled condition. If an extension telephone instrument then goes off-hook, the indicator circuit will remain disabled. If however the instrument goes on-hook while the extension is still off-hook, the indicator circuit will be enabled and a visual indication of an extension being off-hook is given and as long as any extension remains off-hook with the instrument being on-hook, indication of an off-hook extension will be given. As soon as the line becomes completely inactive, the visual indication of an extension off-hook will cease.

BRIEF DESCRIPTION OF THE DRAWING

The single FIGURE of drawings included herewith is a schematic circuit diagram of an extension telephone instrument off-hook detector in accordance with the present invention.

DESCRIPTION OF THE PREFERRED EMBODIMENT

Referring now to the associated drawing, the invention is shown in a typical telephone application where a single telephone line is shown and is connected to a telephone central office. Also connected to the telephone line (but not shown) are one or more other (extension) telephones. The diode bridge and the hookswitch (HS) contacts shown are part of anormal electronic telephone circuit and are shown to merely assist an understanding of the present invention. Neither component however forms a part of that invention. Resistor R1, Zener Diode VR1, and Resistor R2 in combination form a level sensing circuit. Field effect transistor Q1, Diodes D1 and D2, Resistors R3 and R4, and Capacitor C1 in combination form a charging timing circuit. Transistors Q2 and Q3, Diode D3, and Resistors R5, R6 and R8 together act as a latch and discharge circuit and Transistor Q4, light emitting diode LED and Resistors R9 and R7 together comprise a visual indicater circuit. The four functions together combine to operate as a voltage level activated oscillator driving a light emitting diode.

Referring again to the drawing, assuming that no extension telephone is in the off-hook condition, the voltage across the tip and ring will be the central office battery feed voltage, approximately 48 volts DC. This level is large enough to exceed the zener voltage of zener diode VR1 and thus establish a potential across resistor R2 sufficient to turn on field effect transistor Q1. With field effect transistor Q1 in the on condition, no charging potential is available to charge capacitor C1 and thus the two transistor latch consisting of transistors Q2 and Q3 is in the off condition providing no drive to transistor Q4, thus insuring that the visual indicator LED is maintained in the off condition.

If an extension telephone is taken off-hook, the load imposed on the telephone line will cause the tip to ring voltage to drop below the zener voltage of diode VR1 and current flow through resistor R2 will become essentially zero. This action will turn transistor Q1 off and the potential causing capacitor C1 to charge, rises to the battery voltage of battery B1. The rate of charge of capacitor C1 is set by the value of capacitor C1 and resistor R3. As capacitor C1 charges, its potential is felt at the emitter of transistor Q2. Resistors R5 and R6 form voltage divider that sets the threshold of the latch. When the charge on capacitor C1 becomes slightly more positive than the threshold the value established by resistors R5 and R6, transistor Q2 begins to conduct providing base drive to transistor Q3 which in turn provides increased base drive to transistor Q2. Result is a regenerative action causing the latch to turn on very quickly. When the latch turns on, capacitor C1 discharges through transistors Q2, Q3 and Resistor R8. The potential at resistor R8, established by the discharge of capacitor C1 is sufficient to forward bias transistor Q4 and therefore cause current to flow through the light emitting diode LED. The light emitting diode LED will be on only for as long as it takes C1 to discharge to a level insufficient to maintain transistor Q4 conductive. As soon as the latch fires, the potential developed across resistor R8 is applied to the gate of transistor Q1 to turn transistor Q1 on. With Q1 on the charging potential for capacitor C1 is removed forcing capacitor C1 to discharge. This feedback signal insures the discharge of capacitor C1 and therefore insures oscillation.

As capacitor C1 discharges, a point is reached where the latch can no longer stay in conduction, at this point the voltage across resistor R8 drops to zero causing transistor Q4 and transistor Q1 to turn off. This action in turn turns off the light emitting diode LED and ends the flash. When transistor Q1 turns off, the charging potential for capacitor C1 is restored and capacitor C1 will begin to charge again. This cycle will repeat until such time as the extension goes on-hook or until the instrument itself goes off-hook. Should the latter be the case, a bias from downstream of the hookswitch applies a potential via D1 to Transistor Q1 to turn Transistor Q1 on and remove the charging potential for C1 thereby disabling the oscillator action.

The charging time constant is set by capacitor C1 and resistor R3 and the discharge time constant by capacitor C1 and resistor R8. By careful selection of these values, the result is a low duty cycle with the charge time set to be much smaller than the discharge time. The maximum current flow through the light emitting diode LED is proportional to the battery supply voltage and to the series limiting resistor R9. Component value selection can be accomplished so as to select a desired pulse (flash) repetition rate and duty cycle and peak current flow through the light emitting diode, so as to maximize battery life without sacrificing performance.

The present invention may also be incorporated into arrangements where the telephone instruments are connected to two or more lines by incorporating the necessary extension off-hook detector circuitry as taught herein for each line. While but a single embodiment of the present invention has been shown, it will be obvious to those skilled in the art that numerous modifications may be made without departing from the spirit of the present invention which shall be limited only by scope of the claims appended hereto.

What is claimed:

1. In combination, a telephone line connected to a telephone central office, a source of voltage at said telephone central office connected to said line, a plurality of telephone terminal instruments connected to said line and at least a first one of said instruments including a circuit for detecting and indicating the "off-hook" status of at least a second one of said instruments, said detecting and indicating circuit comprising:

timing means; sensing means connected between said telephone line and said timing means normally operated in response to said voltage from said central office on said line to maintain said timing means unoperated; and said sensing means further operated in response to said second one of said telephone instruments connected to said line going off-hook, to render said timing means operated; indicator means; latching means connected between said timing means and said indicator means, operated a predetermined period of time after operation of said timing means to render said indicator means operated, whereby an indication is received at said instrument that said second instrument is in the off-hook condition; and said timing means are further rendered non-operated after a predetermined period of time in response to operation of said latching means; said latching means rendered non-operated in response to said timing means being rendered non-operated; and said indicator means further rendered nonoperated in response to said latching means being rendered non-operated.

2. A combination as claimed in claim 1, wherein: said timing means comprises a capacitor and switching means, connected between said sensing means and said latching means; said switching means operated in response to the voltage on said telephone line from said telephone office, to inhibit the charging of said capacitor.

3. A combination as claimed in claim 1, wherein: said sensing means include a zener diode normally rendered conductive in response to said voltage on said telephone line from said telephone central office and rendered non-conductive in response to said second telephone instrument going "off-hook".

4. A combination as claimed in claim 1, wherein: said indicator means comprise a light emitting diode operated in response to said latching means, to provide a visual indication at said first instrument that said second instrument is in the "off-hook" condition.

5. A combination as claimed in claim 1, wherein: said latching means comprise a transistor switch connected between said timing means and said indicator means, operated in response to said timing means to render said visual indicating means operated.

6. A combination as claimed in claim 1, wherein: said circuit further includes a battery including circuit connections to said capacitor, operated in response to operation of said timing means to charge said capacitor.

* * * * *